US008716170B2

(12) United States Patent
Wolan et al.

(10) Patent No.: US 8,716,170 B2
(45) Date of Patent: May 6, 2014

(54) EGGSHELL CATALYST AND METHODS OF ITS PREPARATION

(75) Inventors: John T. Wolan, Tampa, FL (US); Ali Syed Gardezi, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 13/391,675

(22) PCT Filed: Aug. 23, 2010

(86) PCT No.: PCT/US2010/046293
§ 371 (c)(1),
(2), (4) Date: Feb. 22, 2012

(87) PCT Pub. No.: WO2011/028466
PCT Pub. Date: Mar. 10, 2011

(65) Prior Publication Data
US 2012/0149559 A1    Jun. 14, 2012

Related U.S. Application Data

(60) Provisional application No. 61/236,317, filed on Aug. 24, 2009.

(51) Int. Cl.
*B01J 23/75* (2006.01)
(52) U.S. Cl.
USPC .......................................................... 502/260
(58) Field of Classification Search
None
See application file for complete search history.

(56) References Cited

U.S. PATENT DOCUMENTS

| | | | |
|---|---|---|---|
| 4,962,078 A | 10/1990 | Behrmann et al. | |
| 4,977,126 A | 12/1990 | Mauldin et al. | |
| 5,545,674 A | 8/1996 | Behrmann et al. | |
| 2005/0048658 A1 | 3/2005 | Johnson et al. | |
| 2007/0099797 A1* | 5/2007 | Hu et al. | 502/319 |
| 2008/0255257 A1 | 10/2008 | Kuipers et al. | |
| 2008/0262113 A1 | 10/2008 | Calis et al. | |

OTHER PUBLICATIONS

Enrique Iglesia, Stuart L. Soled, Joseph E. Baumgartner, and Sebastian C. Reyes, "Synthesis and Catalytic Properties of Eggshell Cobalt Catalysts for the Fischer-Tropsch Synthesis", Journal of Catalysis 153, 108-122 (1995).*
Li et al. (Jingwei Li, Yunjie Ding, Xianming Li, Guiping Jiao, Tao Wang, Weimiao Chen and Hongyuan Luo, "New method for the preparation of nonuniform distributed Co/SiO2 catalysts", Chem. Commun., Sep. 25, 2008, 5954-5956).*
Peluso, E. et al., "Eggshell catalyst in Fischer-Tropsch synthesis Intrinsic reaction kinetics," *Chemical Engineering Science*, 2001, pp. 1239-1245, vol. 56.
Zhuang, Y.Q. et al., "Novel synthesis route for egg-shell, egg-white and egg-yolk type of cobalt on silica catalysts," *Applied Catalysis A: General*, 2006, pp. 138-142, vol. 301.
Gardezi, S.A. et al., "Effect of catalyst preparation conditions on the performance of eggshell cobalt/$SiO_2$ catalysts for Fischer-Tropsch synthesis," *Applied Catalysis A: General*, 2012, pp. 151-163, vol. 447-448.
Zhuravlev, L.T., "The surface chemistry of amorphous silica. Zhuravlev model", *Colloids and Surfaces A: Physicochem. Eng. Aspects*, 2000, pp. 1-38, vol. 173.

* cited by examiner

*Primary Examiner* — Emily Le
*Assistant Examiner* — Anita Nassiri Motlagh
(74) *Attorney, Agent, or Firm* — Saliwanchik, Lloyd & Eisenschenk

(57) ABSTRACT

An eggshell catalyst useful for a Fischer-Tropsch (FT) synthesis or other reactions comprises a homogeneously dispersed transition metal and a promoter situated in an active phase in a precisely selected outer region of a catalyst pellet. The active phase region is controlled to a specific depth, which permits the control of the catalysts selectivity, for example, the size of the hydrocarbon chains formed in the FT process. A method of preparing these eggshell catalysts involves a non-aqueous synthesis where polar and non-polar solvents of relatively low vapor pressure are employed to define the depth of penetration of metal species in a refractory oxide substrate, which is followed by fixing and activating metallic catalytic species in the structure by calcination of the catalyst particles.

17 Claims, No Drawings

EGGSHELL CATALYST AND METHODS OF ITS PREPARATION

CROSS-REFERENCE TO RELATED APPLICATIONS

This application is the U.S. national stage application of International Patent Application No. PCT/US2010/046293, filed Aug. 23, 2010, which claims the benefit of U.S. Provisional Application Ser. No. 61/236,317, filed Aug. 24, 2009, the disclosures of which are hereby incorporated by reference in their entireties, including any figures, tables, or drawings.

BACKGROUND

The Fischer-Tropsch (FT) process involves the conversion of carbon monoxide (CO) and hydrogen ($H_2$) to a hydrocarbon ($C_nH_{2n+2}$) and water ($H_2O$) and is employed for the manufacture of liquid hydrocarbons from natural gas, coal, or biomass energy sources. The FT process is most frequently carried out in a fixed bed reactor and requires a catalyst that is normally an active metal or combination of metals that are supported on a refractory oxide.

It is desirable to employ a catalyst that is selective for preparation of hydrocarbons larger than butanes, yet most catalysts form significant amounts of methane, other gaseous hydrocarbons, and waxes. Typically very active catalysts used at low reaction temperatures display better selectivity for liquid alkanes.

Control of the catalytic structure to an eggshell design where the active metals are situated near the particle's surface is preferred to promote selectivity to liquid alkanes as it has been shown that catalytic sites residing in deep small pores of a catalyst particle appear to promote methane formation, presumably due to the greater rate of diffusion of $H_2$ than CO into these deep small pores.

A number of synthetic strategies have been employed to achieve particles with the eggshell architecture, but it is often difficult to control the depth of the catalyst region. Behrmann et al., U.S. Pat. No. 4,962,078, discloses dispersing cobalt as a thin catalytically active film upon a particulate titania or titania-containing support by spraying a solution of a cobalt compound onto titania or titania-containing particles that are preheated and maintained at a temperature of at least 140° C. during spraying. Mauldin et al., U.S. Pat. No. 4,977,126, discloses impregnating and dispersing, as a film or layer, a catalytically effective amount of cobalt on the periphery of a particulate porous inorganic oxide support by spraying a bed of fluidized support particles with a liquid containing a cobalt compound while at 50 to 100° C. Iglesia el al., U.S. Pat. No. 5,036,032, discloses rim type catalyst where support particles are impregnated with a molten cobalt compound at a temperature sufficiently near the melting point to ensure high viscosity of the melt and minimize diffusion into the particles' pores. Peluso et al., *Chemical Engineering Science* 56(2001) 1239-45, discloses bathing fritted filter supported 1.81 mm silica particles with an aqueous metal impregnation solution for a period of 5 to 60 seconds followed by rapid removal of the solution and transferring the particles to a fluidized bed of 60 μm sand at 90° C. before the particles are calcined at 400° C. Kuipers et al., U.S. Patent Application No. 2008/0255257, discloses a method where a particle having a homogeneous distribution of the catalytic metals are treated with an organic acid for periods of 5 minutes to 500 hours (preferably 10 to 50 hours) at temperatures below 150° C. to result in migration of the metals toward the surface of the particle to yield an eggshell structure.

There remains a need to prepare a FT catalyst with an eggshell structure that has a high selectivity for hydrocarbons of a desired molecular weight, yet is readily prepared in a simple, reproducible, and controllable manner.

BRIEF SUMMARY OF THE INVENTION

Embodiments of the invention are directed to eggshell catalyst particles comprising a porous supporting substrate where a catalytic metal species and, optionally, a promoter species are uniformly distributed through a catalytic region proximal the particle's surface where a sharp interface, similar to that established between two immiscible liquids, separates the catalytic region from a core region that is free of the catalytic metal species and any promoter species. The substrate can be any refractory oxide or its equivalent, for example silica, alumina, titania, ceria, or any combination thereof. The catalytic metal species can include Co, Fe, Ni, Ru, or combinations thereof which are known to catalyze the Fischer-Tropsch (FT) reaction, but other metallic species can be used to form eggshell catalytic particles for other reactions. The eggshell catalyst particles can include one or more promoter species selected from the metals Li, Na, K, Mg, Ca, Sr, Ba, Zr, Hf, Ru, Pt, Pd, Re, Rh, Au, Mn, Cs, Ti, Cr, Cu, Mo, W, La, Nd, Ce, Th, Zn, U, or any combination thereof, or a metal oxide such as an oxide or calcium or manganese, which have utility for the FT reaction; or other metals can be included for catalysts of other processes. The catalytic region extends to a desired predetermined depth and the metallic catalytic species can be loaded to a broad range of values, for example about 20 weight percent, which is useful for FT eggshell catalyst.

Other embodiments of the invention are directed to methods to produce the above eggshell catalyst particles. An embodiment involves saturating the particles with a non-solvent toward the metallic species, generally, but not necessarily, a nonpolar solvent, and defining a core volume by carefully removing a portion of the non-solvent from the non-solvent saturated particles to define a core region having the non-solvent. A solvent is then absorbed on these particles to define a surface region that is subsequently loaded with metallic precursor species by contacting with a solution of the metallic precursor species. By adjusting the pH of the system through introduction of a pH adjusting solution comprising a nonaqueous base, the metallic precursor species selectively nucleate in the surface region. After separating non-absorbed liquids from the particles, absorbed liquid is removed as a volatile to fix the metallic species in the surface region of the particles. Calcination of the eggshell particle fixes and activates the metallic catalytic species in the catalytic region of the eggshell catalyst particle. By this method, the metallic species is uniformly deposited throughout the catalytic region but is absent from the core region such that the interface between these regions is sharp and indicative of the interface between the immiscible solvents in the biphasic particle.

DETAILED DESCRIPTION

Embodiments of the invention are directed to novel catalysts for the performance of a reaction, for example the Fischer-Tropsch (FT) reaction used by way of example herein, where the distribution of the hydrocarbons formed can be biased to a large extent by the catalyst structure. More specifically, the catalyst is a particle with an eggshell structure having a very homogeneous distribution of the metallic catalytic sites in a well delineated surface region that extends to a predetermined depth within the pores of a refractory oxide or equivalent substrate. The metallic catalytic site comprises a catalytic metal species and, optionally, a promoter species, commonly a second metallic species.

Other embodiments of the invention are directed to preparing the novel catalyst particles by a method exploiting the formation of an interface between a hydrophobic (non-polar) liquid of sufficiently low vapor pressure within a metal oxide particle, or its equivalent, and a hydrophilic (polar) solution of catalytic metal salt. The pH of the hydrophobic solution is adjusted (raised) to establishment point of zero charge (PZC) conditions with the particle and polar catalytic metal salt solution resulting in a sharp delineation of the homogeneous catalytic region at a selected depth to which the metallic sites are deposited in the particle, followed by calcination of the particles in a reducing atmosphere to fix the precise desired eggshell structure.

The particles can be of a wide variety of sizes, shapes, porosities, pore volumes, and surface areas to permit a sufficient or desired mass transport of hydrogen ($H_2$) and carbon monoxide (CO) into water ($H_2O$) and hydrocarbon ($C_nH_{2n+2}$) out of the catalytic particles under the temperature and gas flow conditions employed during steady state performance of the FT process. For example, in most commonly employed FT processes, the use of generally spherical particles in excess of about 200 μm, often about 2 mm in diameter, promote commercially acceptable rates of hydrocarbon formation at desirable $H_2$/CO feed ratios, temperatures, pressures, pressure drops, and flow rates. Pore sizes can vary, but are generally small, for example nominally about 10 nm in cross-section, where the surface area can be, for example 200-300 $m^2$/g nominal. Those skilled in the art can appreciate these factors as well as others for a robust reactor that is optimized with respect to energy input, costs, throughput, safety, or other process considerations for any desired eggshell particle catalyzed reaction. The novel method according to embodiments of the invention can be designed to permit optimization of the novel catalyst according to embodiments of the invention to be employed in an optimized reactor.

Any refractory metal oxide or its equivalent can be employed as the substrate of the eggshell catalyst particles. Although exemplary embodiments of the invention employ silica, specifically a polycrystalline silica, as the substrate of spherical particles, other refractory metal oxides, including alumina, titania, ceria, zirconia, combinations thereof, zeolites, and mixed metal oxides can be used. Equivalents to the metal oxide supporting substrates that can be employed in embodiments of the invention include silicon nitride, aluminum nitride, silicon carbide, or other ceramics, alone or in combination, that permit the controlled deposition of the catalytic metals where the resulting catalytic particles are stable to the conditions of a FT process. The metal oxide substrate can be a single metal oxide, a mix of native metal oxides, or a spinel. For example, the support can be particles of α- or γ-alumina, cordierite, cordierite-mullite, magnesium aluminate-spinel, mullite, mullite-aluminum titanate, silica, silicon carbide, silicon nitride, spinel, titania, zeolites, zirconia, and/or zirconia-spinel. In one embodiment of the invention the supporting substrate can be carbon.

The metal of the catalytic species can be any metal known to or suspected to act alone or in combination with a promoter as an active catalyst in a FT reaction or other reaction. Although exemplary embodiments of the invention employ cobalt (Co), the catalytic metal can be, but is not limited to, Co, iron (Fe), nickel (Ni), ruthenium (Ru), and combinations thereof for FT reactions. In addition to the metal, a second metallic species, a promoter, can be included in the catalyst with the catalytic metal species. The promoter is optional but can be any alkali earth, transition metal lanthanide or actinide including, but is not limited to, CaO, MnOx, sodium (Na), potassium (K), cesium (Cs), magnesium (Mg), calcium (Ca), strontium (Sr), barium (Ba), zirconium (Zr), hafnium (Hf), ruthenium (Ru), platinum (Pt), palladium (Pd), rhenium (Re), rhodium (Rh), gold (Au), manganese (Mn), titanium (Ti), chromium (Cr), copper (Cu), molybdenum (Mo), tungsten (W), zinc (Zn), lanthanum (La), neodymium (Nd), cerium (Ce), thorium (Th), uranium (U), or any combination thereof. The mass ratio of catalytic metal to promoter metal can vary from 0.1 to 50.0 when both metals are present and where the optimum ratio of metals can be determined experimentally. The promoter can be in the form of a metal oxide, for example calcium oxide or any oxide of manganese.

The eggshell structure is exemplified by a catalytic region proximal to the surface where the catalytic metal species and the promoter species are uniformly dispersed at a loading of 0.5% to 50.0% weight percent. The depth of the catalytic region can vary as desired where an abrupt interface occurs between the catalytic region and a core region that is nearly free of any metallic species other than those of the support substrate. The depth of the catalytic region can extend from about 1 to about 50 percent of the particle's cross-section. For example the depth can be 1, 2, 3, 4, 5, 10, 15, 20, 25, 30, 35, 40, 45, 50, or any intermediate value there between. By control of the depth of this catalytic region, the selectivity for the distribution of hydrocarbons formed can be tuned to a desired molecular weight range. Because of the novel preparation method employed, the depth of the penetration of the metallic species into the core does not vary due to the particle's pore size distribution, which is the case for other FT catalysts and allows some metal precursor to diffuse through larger pores to a significantly greater distance than through smaller pores, thereby leading to a diffuse interface between a catalytic region and core region. Rather, because of the novel metal infusion technique employed in the subject invention, formation of a rather sharp hydrophobic/hydrophilic interface limits the diffusion of the metal species in an abrupt manner at that interface, indicative of an interface between immiscible liquids.

Embodiments of the invention are directed to a non-aqueous method to form the novel eggshell catalytic particles having a controlled uniformly distributed catalytic metal and promoter species in the surface proximal catalytic region. The novel method involves the use of a relatively low volatility hydrophobic (nonpolar) non-solvent and a hydrophilic (polar) solvent that are immiscible to generate an interface within the supporting substrate particle where the polar solvent resides at the surface in a region that will form the catalytic region. The volatility of the non-solvent is low relative to that of the solvent, and designation as a solvent and non-solvent is relative to their affinity for the metallic precursor species and optional promoter precursor species. The non-solvent should have little or no affinity for metallic catalytic species and optional promoter species. The support substrate particles are saturated with the nonpolar non-solvent. The saturated particles are then slowly dried as the change in their mass is monitored until a desired quantity of the nonpolar non-solvent resides in the core of the particles is indicated by the mass. The non-solvent containing particles are then coated with the polar solvent by exposure to that solvent where the mass increase of the particles can be used to establish the amount of polar solvent included and can be used to calculate the depth of the region of these biphasic particles containing the polar solvent. A solution of the metallic precursor and optional promoter precursor species is contacted with the biphasic particles such that the solution blends with the polar solvent in the surface region of the biphasic particles, but does not infiltrate the non-solvent residing in the core region. The solution of the metallic precursor species can be heated to promote displacement of or diffusion of metallic precursor species into the polar solvent in the surface region of the biphasic particles without diffusion into the nonpolar non-solvent of the core region. A pH adjusting solution, which will establish PZC conditions by raising the pH, is added slowly to the particle suspension at a rate sufficiently slow to avoid bulk nucleation of the metallic species but promote nucleation of the metallic catalyst precursor species within the surface region of the biphasic particles. After a determined period of time the liquid can be removed from the suspended particles. Subsequent rapid drying, by imposition of vacuum and/or heating, removes the solvent and non-solvent and fixes the metallic precursor species in the catalytic region of the eggshell catalyst particles. Calcination of the eggshell particle can form the metallic catalytic species that comprise the active catalyst sites within the catalytic region of the particles.

Any non-polar solvent can be employed including mixed solvents, as long as the liquid that resides in the core region of the biphasic particles is a non-solvent for the metallic precursor species and is sufficiently volatile for removal from the particle. Non-solvents that can be used include hydrocarbons, for example $C_7$ to $C_{12}$ hydrocarbons, $Si_2$ to $Si_7$ dimethylsiloxanes, or fluorinated equivalents of appropriate volatilities. The polar solvents can be ethanol, other alcohols, or other solvents for metallic precursor species. In other embodiments of the inventive method the metallic precursor species can be hydrophobic, for example metal alkyls, and the solvents can be non-polar and the non-solvents can be polar. The pH adjusting solution can be an appropriate non-aqueous base, for example urea or an amine, that can promote deposition of the metallic precursor species, the metallic catalytic species, or some intermediate species which is then fixed within the catalytic region near the surface of the particle.

Methods and Materials

Silica Gel Support Pretreatment

Porous Cariact Q-10 silica gel was heated in an air furnace at 300-400° C. for 2 to 3 hours and transferred to a glove-box having a dry nitrogen atmosphere.

Biphasic Particle Preparation

A 5 g portion of the dried silica gel particles, density 0.42 g/ml, were soaked in the nonpolar solvent n-heptane for 10 hours. The n-heptane saturated particles were dried by heating from 30° C. to 60° C. at 1 K/minute and held at 60° C. for 5 minutes where the total weight of the n-heptane containing particle was 7 g. After cooling to room temperature, the n-heptane containing particles were placed in absolute ethanol to yield the biphasic particles with a total weight of 9.3 g.

Preparation of a Co Precursor Salt Solution

A 15 g sample of Cobalt nitrate hexahydrate was heated to 160-180° C. until an anhydrous residue of 9.4 g resulted. After cooling to room temperature 10 mL of anhydrous ethanol was added to form a concentrated solution.

Preparation of a pH Adjusting Urea Solution

A 0.45 g portion of urea was dissolved in 5 mL of absolute ethanol with stirring for 2-3 hours.

Infiltration of the Biphasic Particles with the Cobalt Nitrate Solution

The Cobalt nitrate solution was warmed to 70° C. and mixed with the biphasic particles in a fritted funnel. The urea solution was added to the rapidly stirred suspension in the fritted funnel in a dropwise manner. After 40 to 60 seconds, as determined experimentally, the liquid was removed from the suspended particles by vacuum filtration.

Fixing and Activating the Catalytic Region of the Eggshell Catalyst Particles

The $Co(NO_3)_2$ infiltrated particles were placed in a vacuum furnace that was preheated to 90° C. and evacuated to rapidly remove the polar and non-polar solvents while maintaining the eggshell profile of the catalytic region of the particles. The particles were removed after 24 hours and calcinated in air at 400° C. for 4 hours.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:

1. An eggshell catalyst particle prepared by the process; comprising:
   providing a dry supporting substrate particle comprising a refractory oxide;
   absorbing a nonpolar solvent in said supporting substrate particle to form a saturated nonpolar solvent particle;
   removing a portion of said nonpolar solvent from, said solvent saturated particle to form a core residual nonpolar solvent particle;
   absorbing a polar solvent in said core residual nonpolar solvent particle to form a biphasic particle having said polar solvent residing in a surface region proximal to the surface and said nonpolar solvent in a core region of said biphasic particle wherein a sharp liquid-livid interface between said non-polar solvent and said polar solvent;
   contacting said biphasic particle with a metal catalyst precursor solution comprising at least one dissolved metal salt in said polar solvent or a second solvent miscible in said polar solvent;
   adding a pH adjusting solution comprising a nonaqueous base to selectively nucleate metallic precursor species in said surface region;
   separating particulates from non-absorbed liquids;
   volatilizing particle absorbed liquids to form an eggshell particle; and
   calcining said eggshell particle to form said eggshell catalyst particle, wherein a catalytic region comprising a catalytic metal species and a core region free of said catalytic metal species display a sharp interface indicative of said sharp liquid-liquid interface between said polar solvent and said nonpolar solvent of the biphasic particle and wherein depth of penetration of said catalytic region into said core region does not vary, and
   wherein said catalytic metal species is uniformly distributed through said catalytic region proximal the particle's surface.

2. The particle of claim 1, wherein said refractory oxide comprises silica, alumina, titania, ceria, or any combination thereof.

3. The particle of claim 1, wherein said catalytic metal species comprises Co, Fe, Ni, Ru, or any combinations thereof.

4. The particle of claim 1, wherein said metal catalyst precursor solution further comprises a second metal salt and said catalytic region further comprises a promoter species, wherein said second metal salt and said promoter species comprises Li, Na, K, Cs, Mg, Ca, Sr, Ba, Zr, Hf, Ru, Pt, Pd, Re, Rh, Au, Mn, Ti, Cr, Cu, Mo, W, Zn, La, Nd, Ce, Th, U, or any combination thereof.

5. The particle of claim 1, wherein said promoter species comprises an oxide of calcium or manganese.

6. The particle of claim 1, wherein said catalytic region extends to a depth of 1 to 50 percent of the particle's cross-section.

7. The particle of claim 1, wherein said catalytic region contains said metal species at a level of 0.5 to 50 weight percent.

8. The particle of claim 1, wherein said supporting substrate is silica, and said catalytic metal species is Co at a level of 20 weight percent.

9. A method to prepare an eggshell catalyst particle according to claim 1, comprising:
   providing a dry supporting substrate particle comprising a refractory oxide;
   absorbing a nonpolar solvent in said supporting substrate particle to form a saturated nonpolar solvent particle;
   removing a portion of said nonpolar solvent from said solvent saturated particle to form a core residual nonpolar solvent particle;
   absorbing a polar solvent in said core residual nonpolar solvent particle to form a biphasic particle having said polar solvent residing in a surface region proximal to the surface and said nonpolar solvent in a core region of said biphasic particle;
   contacting said biphasic particle with a metal catalyst precursor solution comprising at least one dissolved metal salt in said polar solvent or a second solvent miscible in said polar solvent;
   adding a pH adjusting solution comprising a nonaqueous base to selectively nucleate metallic precursor species in said surface region;
   separating particulates from non-absorbed liquids;
   volatilizing particle absorbed liquids to form an eggshell particle; and
   calcining said eggshell particle to form said eggshell catalyst particle, wherein a catalytic region and a core region display an interface indicative of the interface of said polar solvent and said nonpolar solvent of the biphasic particle, and wherein depth of penetration of said catalytic region into said core region does not vary.

10. The method of claim 9, wherein said nonpolar solvent is less volatile than said polar solvent.

11. The method of claim 9, wherein said nonpolar solvent comprises heptane and said polar solvent comprises ethanol.

12. The method of claim 9, wherein said metal salt comprises $Co(NO_3)_2$ and said polar solvent comprises ethanol.

13. The method of claim 9, wherein said metal catalyst precursor solution further comprises a promoter precursor species.

14. The method of claim 9, wherein said separating comprises filtration.

15. The method of claim 9, wherein said absorbing a nonpolar solvent comprises bathing in said nonpolar solvent.

16. The method of claim 9, wherein said absorbing a polar solvent comprises bathing in said polar solvent.

17. The method of claim 9, wherein said removing comprises heating to a temperature below the boiling point of said nonpolar solvent until a prescribed change in mass occurs, wherein the volume of said core region is defined by the mass of residual nonpolar solvent.

* * * * *

UNITED STATES PATENT AND TRADEMARK OFFICE
CERTIFICATE OF CORRECTION

PATENT NO. : 8,716,170 B2
APPLICATION NO. : 13/391675
DATED : May 6, 2014
INVENTOR(S) : John T. Wolan, deceased and Ali Syed Gardezi It is certified that error appears in the above-identified patent and that said Letters Patent is hereby corrected as shown below:

In the Claims

Column 6,
Claim 1, Line 28, "from, said" should read --from said--.
Claim 1, Line 35, "liquid-livid" should read --liquid-liquid--.

Signed and Sealed this
Eleventh Day of November, 2014

Michelle K. Lee
*Deputy Director of the United States Patent and Trademark Office*